United States Patent
Cheon

(10) Patent No.: US 8,966,156 B2
(45) Date of Patent: Feb. 24, 2015

(54) MEMORY DEVICE, MEMORY SYSTEM AND MAPPING INFORMATION RECOVERING METHOD

(75) Inventor: Wonmoon Cheon, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1333 days.

(21) Appl. No.: 12/588,830

(22) Filed: Oct. 29, 2009

(65) Prior Publication Data

US 2010/0138592 A1    Jun. 3, 2010

(30) Foreign Application Priority Data

Dec. 2, 2008  (KR) .................... 10-2008-0121244

(51) Int. Cl.
*G06F 12/02*    (2006.01)

(52) U.S. Cl.
CPC .... *G06F 12/0246* (2013.01); *G06F 2212/7201* (2013.01); *G06F 2212/7207* (2013.01)
USPC ......................................... 711/103; 711/202

(58) Field of Classification Search
None
See application file for complete search history.

(56) References Cited

U.S. PATENT DOCUMENTS

| | | | |
|---|---|---|---|
| 6,483,901 B1 * | 11/2002 | Cuallo ..................... | 379/88.28 |
| 6,535,949 B1 * | 3/2003 | Parker ........................ | 711/103 |
| 6,711,663 B2 | 3/2004 | Lai et al. | |
| 6,901,499 B2 | 5/2005 | Aasheim et al. | |
| 7,076,599 B2 * | 7/2006 | Aasheim et al. ............. | 711/103 |
| 7,139,883 B2 | 11/2006 | Aasheim et al. | |
| 7,634,494 B2 * | 12/2009 | Bangalore et al. .................... | 1/1 |
| 2002/0087673 A1 * | 7/2002 | Selkirk et al. ................ | 709/223 |
| 2003/0093610 A1 | 5/2003 | Lai et al. | |
| 2003/0163631 A1 | 8/2003 | Aasheim et al. | |
| 2003/0163635 A1 | 8/2003 | Aasheim et al. | |
| 2008/0177937 A1 | 7/2008 | Nishihara et al. | |

* cited by examiner

*Primary Examiner* — Gary Portka
(74) *Attorney, Agent, or Firm* — Harness, Dickey & Pierce, P.L.C.

(57) ABSTRACT

Disclosed is a memory device which comprises a data storing part having plural physical storage spaces; and a control part for storing data in the data storing part, wherein each of the physical storage spaces comprises a main area for storing user data at a write operation and a spare area for storing additional data other than the user data, the additional data including a logical address corresponding to a physical storage space and a link value indicating a physical storage space to be accessed next.

13 Claims, 14 Drawing Sheets

MEMORY DEVICE, MEMORY SYSTEM AND MAPPING INFORMATION RECOVERING METHOD

CROSS-REFERENCE TO RELATED APPLICATIONS

This U.S. non-provisional patent application claims priority under 35 U.S.C §119 to Korean Patent Application No. 10-2008-0121244 filed on Dec. 2, 2008, the entire contents of which are incorporated herein by reference.

BACKGROUND

Example embodiments relate to a memory device, a memory system, and a mapping information recovering method.

A flash memory is a type of Electrically Erasable Programmable Read Only Memory (EEPROM) and may be used to replace a Hard Disk Drive (HDD). As compared with a conventional HDD, the flash memory provides more rapid access performance, and its size and power consumption are smaller. Further, since flash memory may be more robust against external impact, it is widely used as a storage device for portable apparatuses.

Storage devices with flash memories, for example flash memory cards, cellular phones, Solid State Drives (SSDs), and the like store mapping information between logical addresses and flash physical addresses. Such mapping information may be generated when a write request is issued with respect to a flash memory. It is possible to store mapping information in a flash memory whenever the mapping information is changed. This may degrade the performance of a storage/memory/computing system including the flash memory. In some systems, the mapping information may be retained in RAM, and the mapping information stored in the RAM may be provided to the flash memory periodically. In this case, no mapping information might be stored in the flash memory at sudden power-off.

The write performance of a storage device may vary according to frequency with which mapping information is stored in a flash memory. Further, a time taken to recover final mapping information before power-off may vary depending on the algorithm used for managing mapping information. This recovery time may be part of an initialization time of a storage device, which may be a factor used to determine a system booting time.

SUMMARY

Example embodiments are directed to provide a memory system and a mapping information recovering/managing method capable of recovering mapping information due to sudden power-off.

Example embodiments provide a memory system and a mapping information recovering method capable of improving the write performance.

Example embodiments provide a memory system and a mapping information recovering method capable of reducing mapping information recovery time.

Example embodiments provide a memory unit which may comprise at least one physical storage space including a main area for storing user data at a write operation, and a spare area for storing additional data other than the user data, the additional data including a logical address corresponding to a physical storage space and a link value indicating a physical storage space to be accessed next.

Example embodiments provide a memory device which may comprise a memory unit; and a controller for controlling the memory unit. The memory device may include a plurality of physical storage spaces.

Example embodiments provide a memory system which may comprise a memory device; a processor configured to control the memory device, and a host interface configured to receive information from a host and to forward the information to the processor, the information including at least one of commands and addresses.

Example embodiments provide a mapping information recovering method of a memory system which includes a memory device and a memory controller controlling the memory device, the memory device comprising a physical storage space having a main area for storing user data at a write operation and a spare area for storing additional data other than the user data, the additional data including a logical address corresponding to a physical storage space and a link value indicating a physical storage space to be accessed next. The method may comprise reading first mapping information from a meta area; scanning the user area using forward link scanning based on the link value to take second mapping information, and recovering mapping information from the first mapping information and the second mapping information.

BRIEF DESCRIPTION OF THE FIGURES

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

Non-limiting and non-exhaustive embodiments will be described with reference to the following figures, wherein like reference numerals refer to like parts throughout the various figures unless otherwise specified. In the figures:

FIG. 11 is a diagram showing items of meta blocks according to example embodiments.

FIGS. 12A to 12C are diagrams for describing an operation of recovering mapping information at an initialization operation in a flash memory system according to example embodiments.

DETAILED DESCRIPTION OF EXAMPLE EMBODIMENTS

Figure 1:
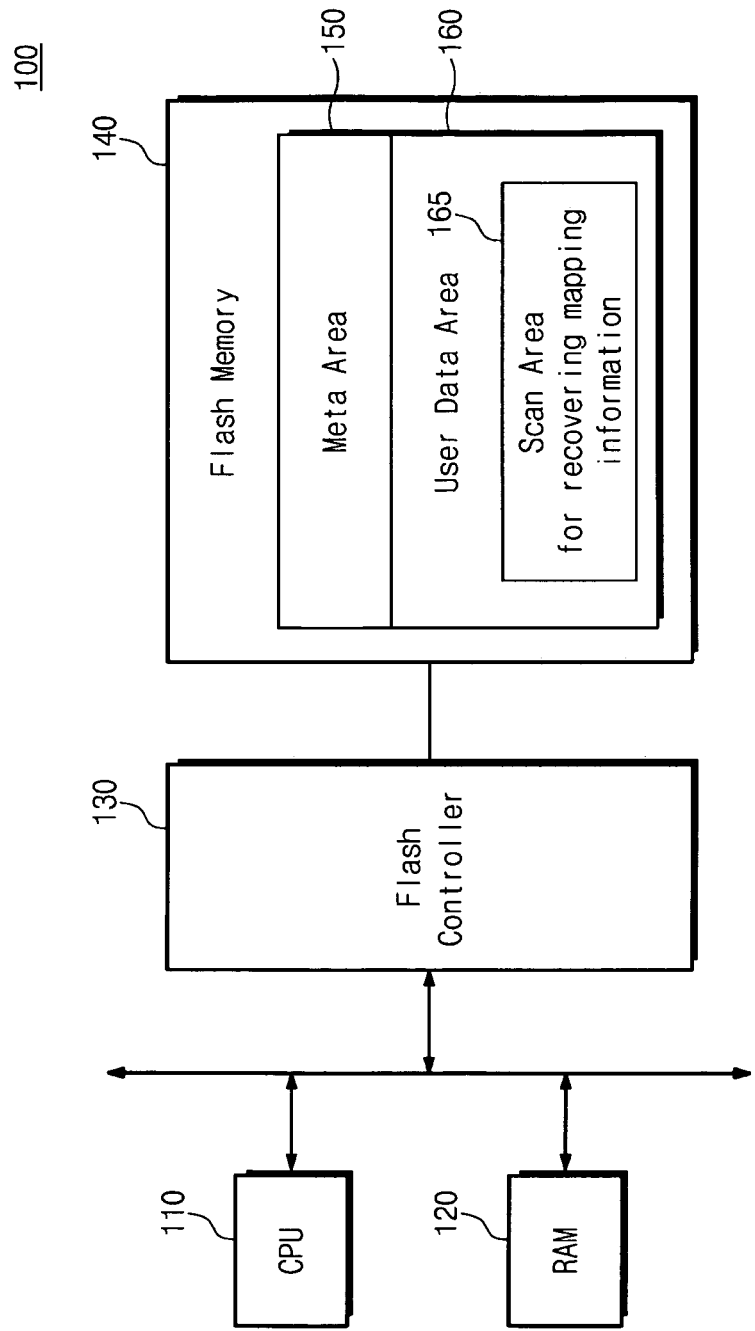
FIG. 1 is a block diagram showing a flash memory system according to example embodiments.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

A memory system according to example embodiments may be configured to recover mapping information based on both mapping information stored in a meta area and mapping information obtained via forward link scanning, at its initialization operation. According to example embodiments, forward link scanning refers to a process in which information indicating a physical storage space to be scanned next is read when any physical storage space is scanned. A memory device applied to the memory system of example embodiments may be configured to perform a write operation which is suitable for the forward link scanning. This will be more fully described below. With the memory system according to example embodiments, it is possible to reduce a time taken to recover mapping information and to manage it effectively.

FIG. 1 is a block diagram showing a flash memory system according to example embodiments.

Referring to FIG. 1, a flash memory system 100 of example embodiments may include CPU 110, RAM 120, a flash controller 130, and a flash memory 140. The flash memory 140 may include a meta area 150 and a user data area 160. The user data area 160 may have a scan area 165 for recovering mapping information. The scan area 165 may be variable, and may be scanned by a forward link scanning operation.

Recovering of mapping information of the flash memory system 100 may be accomplished by mapping information read from the meta area 150 and mapping-associated information scanned from the scan area 165. According to example embodiments, the scan-associated information may be mapping information which is not yet updated at the meta area 150. For example, the scan-associated information may include a logical address stored in a physical storage space at a write operation. The logical address may be an address corresponding to the physical storage space.

The memory system 100 in FIG. 1 may be a system including a flash memory. But, it is well understood that the memory system according to example embodiments is not limited to a system including a flash memory. For example, the memory system is able to be applied to a system having a volatile memory, for example, DRAM, SDRAM, or the like or a non-volatile memory, for example, a NAND flash memory, a NOR flash memory, MRAM, PRAM, FRAM, or the like.

The CPU 110 may control an overall operation of the flash memory system 100. The RAM 120 may be used to temporarily store data needed for operations of the flash memory system 100. The RAM 120 may be formed of a volatile memory device, for example, DRAM, SRAM, or the like.

As a memory controller, the flash controller 130 may control the flash memory 140 according to a read/write request of a host. The flash controller 130 may be configured to include an ECC engine for error detection and correction of the flash memory 140.

The flash memory 140, as illustrated in FIG. 1, may include a meta area 150 for storing management information needed to manage the flash memory 140 and a user data area 160 for storing user data according to a host request. The flash memory 140 may be configured to be suitable for forward link scanning. In particular, the flash memory 140 may be configured to store user data, a logical address, and a link value in a physical storage space corresponding to a logical address received at a write operation for the user data. According to example embodiments, the link value may be a value used to indicate a physical storage space to be scanned next with respect to a physical storage space being currently scanned.

The management information stored in the meta area 150 may include mapping information. The user data area 160 may include the scan area 165 where a forward link scan operation is performed to recover mapping information. The scan area 165 may include mapping-associated information which is not yet updated at the meta area 150. The scan area 165 may be scanned using forward link scanning at an initialization operation.

The scan area 165 may indicate a set of pages to be scanned. The indicated pages may be active pages. A size of the scan area 165 may be variable, and not fixed. In case of the scan area 165, a scan operation may commence using forward link scanning from a start page based on physical storage space information stored in the meta area 150.

The flash memory 140 in FIG. 1 is illustrated to include only a data storage area. But, according to example embodiments, that the flash memory 140 may further include a control part (not shown) for storing data in the data storage area.

The flash memory system 100 may be configured to scan the scan area 165 using forward link scanning at an initialization operation or a mapping information recovering operation. This scanning operation may be made based on link values stored in respective physical storage spaces. The link values may be addresses each indicating a physical storage space to be scanned next. That is, each of the link values may be a pointer used to direct an object to be next scanned. This will be more fully described with reference to FIG. 5.

Read and write units of a flash memory may be different from those of other memories or interfaces. That is, the flash memory may perform read and write operations in a page unit, while a conventional hard disk may conduct read and write operations in a sector unit. Further, the flash memory may necessitate an erase operation before a write operation. At this time, the flash memory may perform an erase operation in units of blocks each including a plurality of pages.

Due to the above-described characteristics of the flash memory, a flash memory system having the flash memory may be configured to have a software module for effectively managing the flash memory. Such a software module is called a Flash Translation Layer (FTL).

Figure 2:
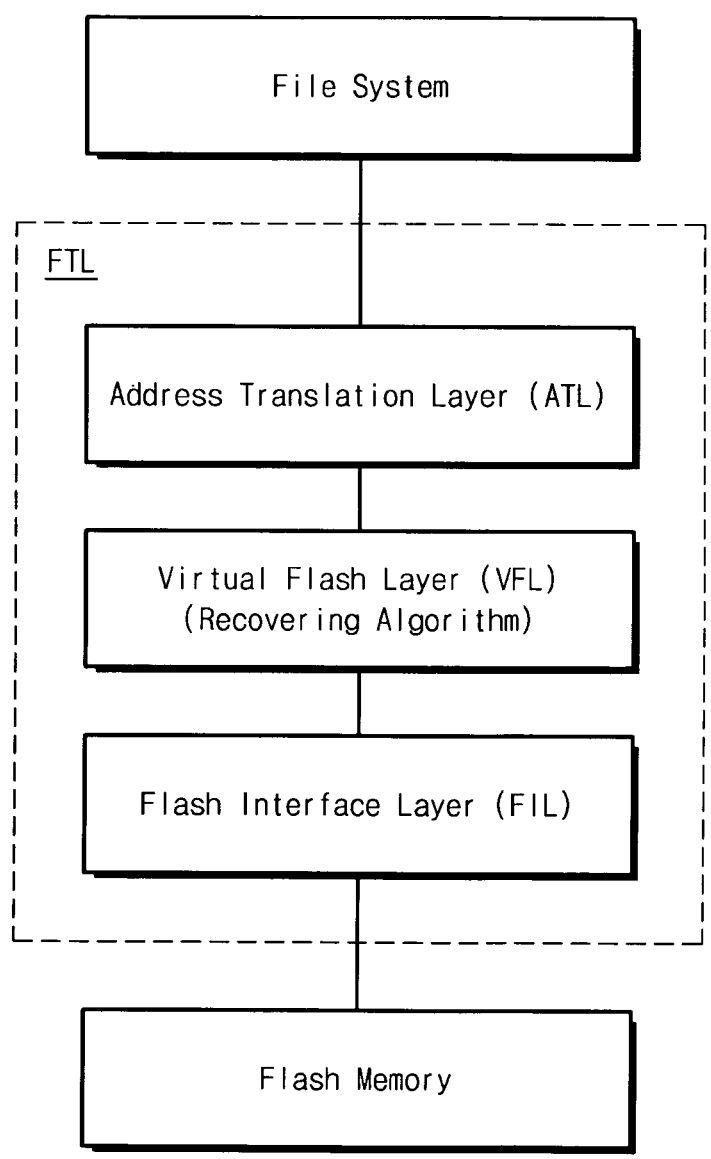
FIG. 2 is a diagram showing software architecture of a flash memory system according to example embodiments.

FIG. 2 is a diagram showing the software architecture of a flash memory system according to example embodiments.

Referring to FIG. 2, FTL may perform an address translation process for read and write operations of a flash memory 140 using a logical address from a file system as a parameter. The FTL may convert a logical address (LA) sent from the host into a physical address (PA). As illustrated in FIG. 2, the FTL may include an Address Translation Layer (ATL), a Virtual Flash Layer (VFL), and a Flash Interface Layer (FIL).

The ATL may convert a logical address LA sent from the file system into a logical page address. The ATL may conduct an address conversion process of a logic address space. According to example embodiments, the ATL may perform an address conversion process for a logical address LA from a host based on mapping information where the logical address LA is mapped to a logical page address LPA of the flash memory 140. This Logical to Logical Address mapping information (hereinafter, referred to as 'L2L') may be stored in a meta area 150.

The VFL may convert the logical page address LPA converted by the ATL into a Virtual Page Address (VPA). According to example embodiments, the VPA may correspond to a physical address of a virtual flash memory. The virtual flash memory 140 may not include bad blocks as a result of completing a bad block managing process. According to example embodiments, the virtual page address VPA may correspond to a physical block of the flash memory 140 excluding bad blocks.

The VFL may include a recovering algorithm for recovering a Logical to Virtual Address Mapping information (hereinafter, referred to 'L2V') based on the L2V stored in the meta area 150 and information scanned from a scan area 165. The VFL may perform an address converting operation of the virtual address space using the L2V recovered via the recovering algorithm.

The VFL charges a control operation on a flash controller 130 instead of the ATL performed at the flash controller 130 and a flash memory 140 needing an erase operation at an interface operation.

The FIL may convert a virtual page address of the VFL into a physical page address of the flash memory 140. The FIL may perform a low level operation for interfacing with the flash memory 140. For example, the FIL may include a low level driver for controlling the hardware of the flash memory 140 and an ECC and bad block management (BBM) module for correcting errors of data read out from the flash memory 140.

It may be beneficial for flash memory systems to include methods for handling the case where power is turned off suddenly. This may be realized by hardware and software. In the case where hardware is used, a super-cap or a battery may be used to maintain a power for storing mapping information. In case where software is used, a mapping algorithm of the FTL may configure mapping information and stores it to be recovered in order to provide against power-off.

Using hardware may be disadvantageous due to, for example, a number of parts and cost of a storage device, physical space, lifetime, and the like. Using hardware may be advantageous for simplifying an algorithm of the FTL.

Using software may be suitable to overcome the above-described drawbacks of the hardware way. But, using software may cause an increase in the amount and number of mapping data stored according to a mapping algorithm of the FTL. This may force the performance to vary. For example, if the amount of stored mapping data increases, the performance may decrease. As the mapping data is frequently stored in the flash memory, the performance may decrease. Further, at an initialization operation of a storage device, a time taken to recover mapping information may vary according to the mapping algorithm of the FTL.

Figure 3:
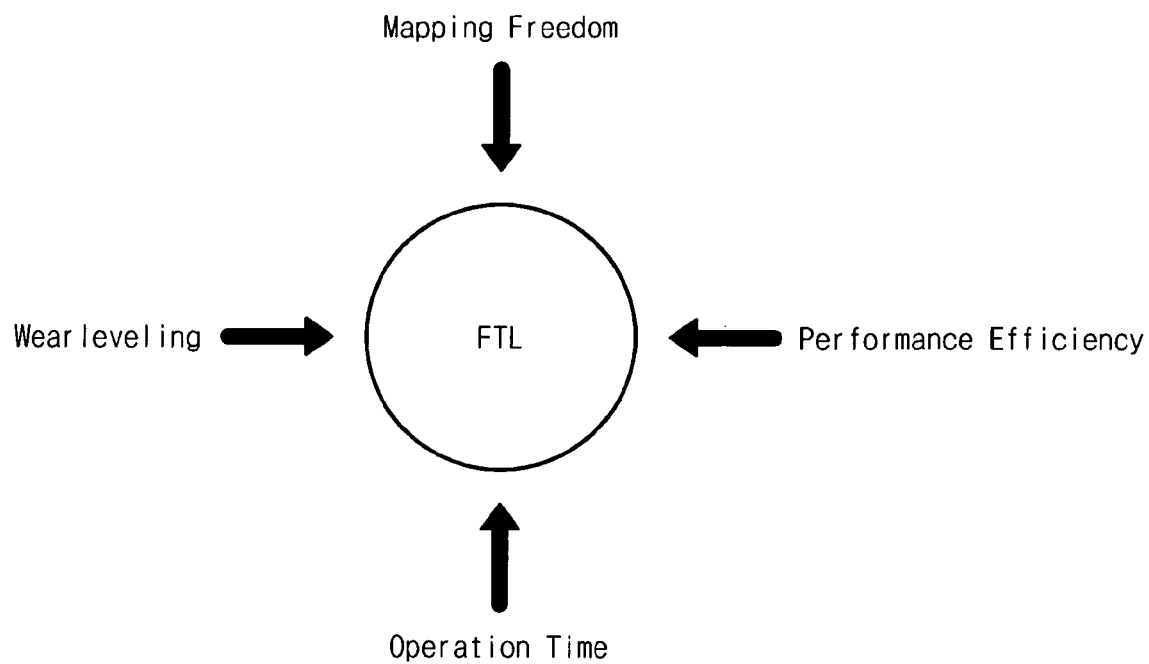
FIG. 3 is a diagram for describing factors considered to design a file translation layer according to example embodiments.
Figure 4:
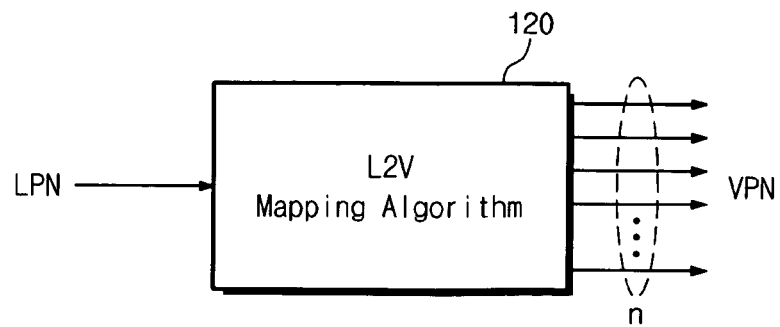
FIG. 4 is a diagram illustrating a mapping algorithm for increasing an operating efficiency of a file translation layer.

FIG. 3 is a diagram for describing factors considered to design a file translation layer according to example embodiments, and FIG. 4 is a diagram for illustrating a mapping algorithm for increasing an operating efficiency of a file translation layer.

As illustrated in FIG. 3, a flash translation layer (FTL) of example embodiments may be designed based on various factors including, for example, mapping freedom, performance efficiency, wear-leveling, operation time, and the like.

The FTL of example embodiments may be configured such that the mapping freedom increases, the performance is improved, the wear-leveling decreases, and the operation time decreases. For example, one manner in which performance of the FTL may be improved is that the number n of virtual page numbers VPN output from a logical to virtual address mapping algorithm which receives a logical page number LPN may be reduced, as illustrated in FIG. 4. The LPN is a number corresponding to a logical page address and a number corresponding to the virtual page address.

In order to perform an operation of recovering mapping information according to the above-described FTL, the flash memory system 100 of example embodiments may be configured to store a physical storage space for example, a virtual page address of an object to be next scanned together with a logical page address corresponding to each physical page when user data is written.

Figure 5:
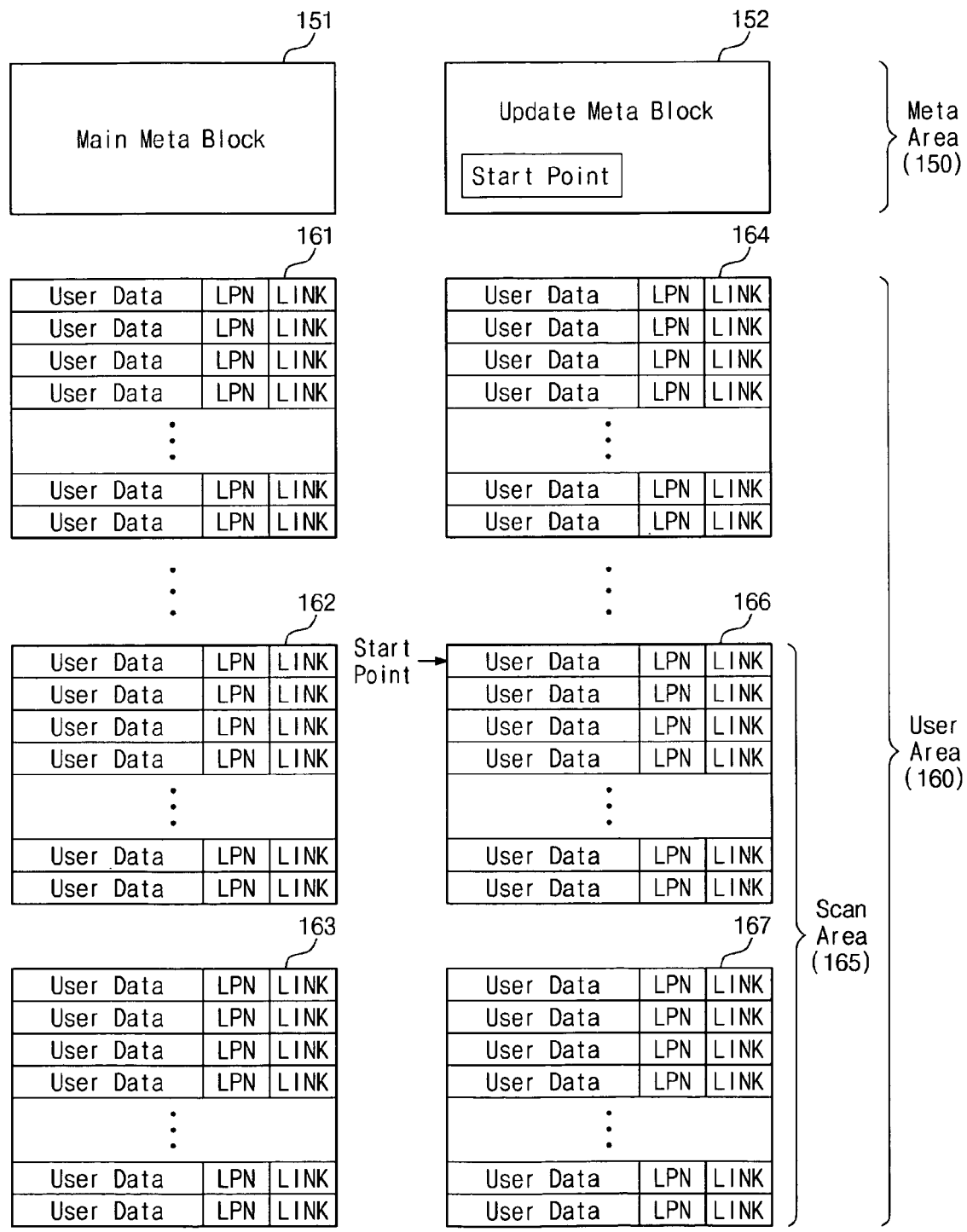
FIG. 5 is a diagram showing a memory region for storing mapping-associated information needed to recover mapping information according to example embodiments.

FIG. 5 is a diagram showing a memory region for storing mapping-associated information needed to recover mapping information according to example embodiments.

Referring to FIG. 5, a flash memory 140 may include a meta area 150 and a scan area 165. The meta area 150 may store mapping information associated with the flash memory 140, and the scan area 165 may store mapping-associated information not yet updated at the meta area 150.

The meta area 150 may include a main meta block 151 and an update meta block 152. The main meta block 151 may store a logical to logical address mapping information L2L, a logical to virtual address mapping information L2V, and a virtual to logical address mapping information V2L. The virtual to logical address mapping information V2L may be a reversed function of the logical to virtual address mapping information L2V. Mapping information stored in the main meta block 151 may not have an up-to-date mapping state.

The update meta block 152 may additionally store mapping information updated at a state where mapping information is stored in the main meta block 151. According to example embodiments, the update meta block 152 is called a map log block. Update information may be stored in each page of the update meta block 152 until the length of items linked by link values becomes maximum and extension is not conducted.

A start point is stored in each page of the update meta block 152. The start point is used to direct a location where scanning of mapping information commences. Thus, it is possible to scan mapping information using the start point at an initialization operation of the flash memory system 100.

The user area 160 includes a plurality of blocks 161 to 167 where user data is stored. According to example embodiments, the blocks 166 and 167 constitute a scan area 165. The scan area 165 may be an area changed according to a physical storage space of a start point, and may not be fixed at the user data area 160.

FIG. 5 illustrates the scan area 165 having two blocks. However, example embodiments are not limited to the example illustrated in FIG. 5 and scan area 165 may include any number of blocks. The size of the scan area 165 may be determined according to an algorithm of the FTL. For example, this algorithm may be configured to perform a scan operation until a clean page not being programmed is found.

Each page of the user area 160 may be divided into an area for storing user data and an area for storing information necessary for a scan operation. According to example embodiments, the information necessary for a scan operation may include a logical page number LPN corresponding to a physical address of each page and a link value LINK, which may be a physical address to be scanned next. According to example embodiments, the LPN and LINK may be stored in a spare area of each page.

A memory device according to example embodiments is not limited to a flash memory. Example embodiments may be applied to a memory device which includes a main area for storing user data and a spare area for storing additional data excepting the user data. According to example embodiments, the additional data may include a logical address where user data is stored, and a physical address to be scanned next.

Figure 6:
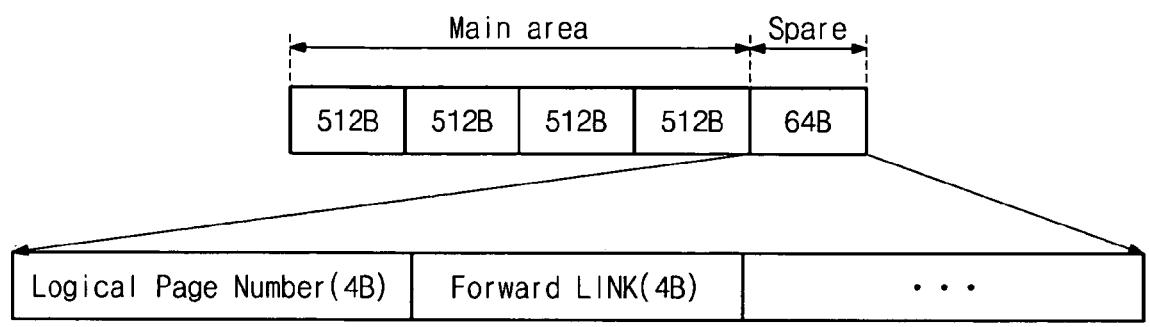
FIG. 6 is a diagram showing a configuration of a 2 KB page according to example embodiments.

FIG. 6 is a diagram showing a configuration of a 2 KB page of user area 160 according to example embodiments.

Referring to FIG. 6, a page may include a 2048 B main area where user data is stored, and a 64 B spare area where additional data is stored with scan information. The main area may be formed of four sectors each having a 512 B size. The spare area may store a logical page number LPN and a link value LINK. A size of the spare area may be, for example, 64 B, a size of the logical page number may be, for example, 4 B, and a size of the link value may be, for example, 4 B. An ECC value may be included in the spare area.

Figure 7:
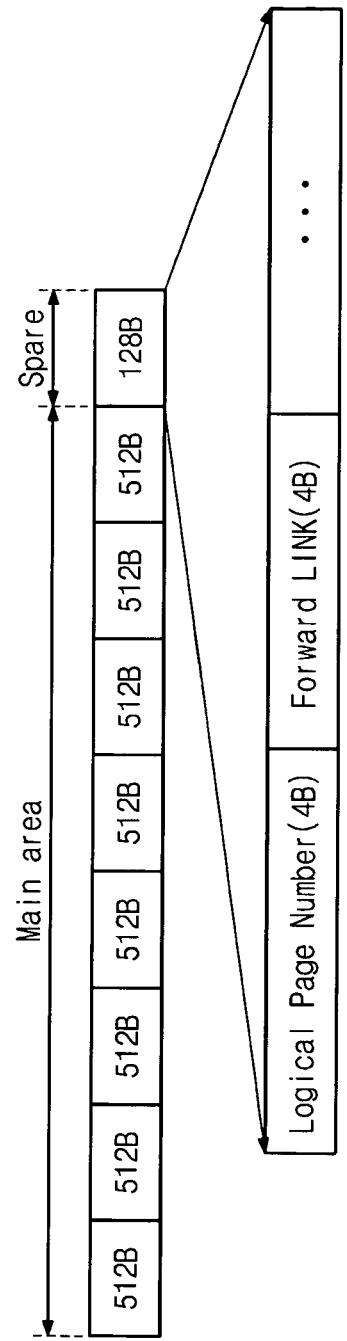
FIG. 7 is a diagram showing a configuration of a 4 KB page according to example embodiments.

FIG. 7 is a diagram showing a configuration of a 4 KB page of user area 160 according to example embodiments.

Referring to FIG. 7, a page may include a 4 KB main area where user data is stored, and a 128 B spare area where additional data is stored with scan information. The main area may be formed of eight sectors. The spare area may store a 4 B logical page number LPN and a 4 B link value LINK.

The link value LINK according to example embodiments may be a physical address indicating a page to be scanned next at a scan operation. The link value LINK may be determined according to an algorithm of the FTL at a write operation of each page. The link value thus determined may be stored at each page together with user data and a logical page number. For this, the FTL may include an algorithm for determining a link value by searching for a desirable or optimum next page to be scanned.

Figure 8:
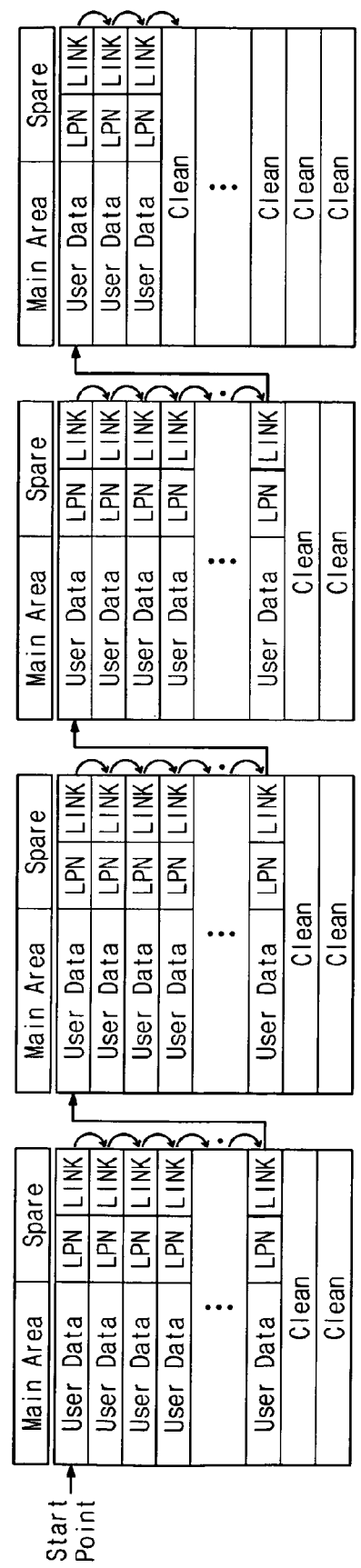
FIG. 8 is a diagram for describing a configuration of active pages according to link values.

FIG. 8 is a diagram for describing a configuration of active pages according to link values. An active page may be defined as a page to be scanned during a mapping information recovering operation. A scan operation may be performed as follows.

A scan operation may be carried out from a page, indicated by a start point stored in an update meta block 152, according to a link value stored in each page. According to example embodiments, a scan operation of each page may be accomplished by reading a logical page number LPN stored in each page and associating the logical page number LPN with a corresponding virtual physical page number VPN.

Recovery of mapping information may be accomplished with a logical page number LPN stored in each page read according to a link value LINK. At this time, the last of linked items may be a clean page not being programmed. According to example embodiments, if a clean page is scanned, the mapping information recovering operation may be ended.

At the mapping information recovering operation, the flash memory system 100 according to example embodiments may read information indicating a page to be scanned next simultaneously with a page scan operation. According to example embodiments, each page stores information of a page to be scanned next. The scan operation is a forward link scanning operation.

The forward link scanning operation according to example embodiments may not require a meta page to be additionally stored at every boundary between blocks. Thus, it may be possible to reduce a meta page storing number. Further, in accordance with the forward link scan operation, instead of scanning a whole space area of each block, pages from a page of a start point up to a page prior to a clean page may be scanned. According to example embodiments, it may not be necessary to scan a whole spare area of each block. This means that a scan time may be reduced using forward link scanning. As a result, it may be possible to reduce an initialization time of a flash memory system.

Further, it may be possible to limit the number of linked items according to a limitation of an initialization time needed by an application of the flash memory system according to example embodiments. For example, it may be assumed that the number of linked items is limited to 256. According to this assumption, if 120 μs is a time taken to read one page, an initialization time of the flash memory system may be about 30 ms (120 μs*256).

In a case where a whole spare area of each block is scanned and where a flash memory system includes a flash memory with a 2 GB capacity and 8192 blocks, an initialization time may be about 63 seconds (120 μs*64*8192).

In particular, the forward link scan operation according to example embodiments may be advantageous when applied to a random write operation where a random write operation refers to a write operation in which addresses for the write operation are not successive.

Figure 9:
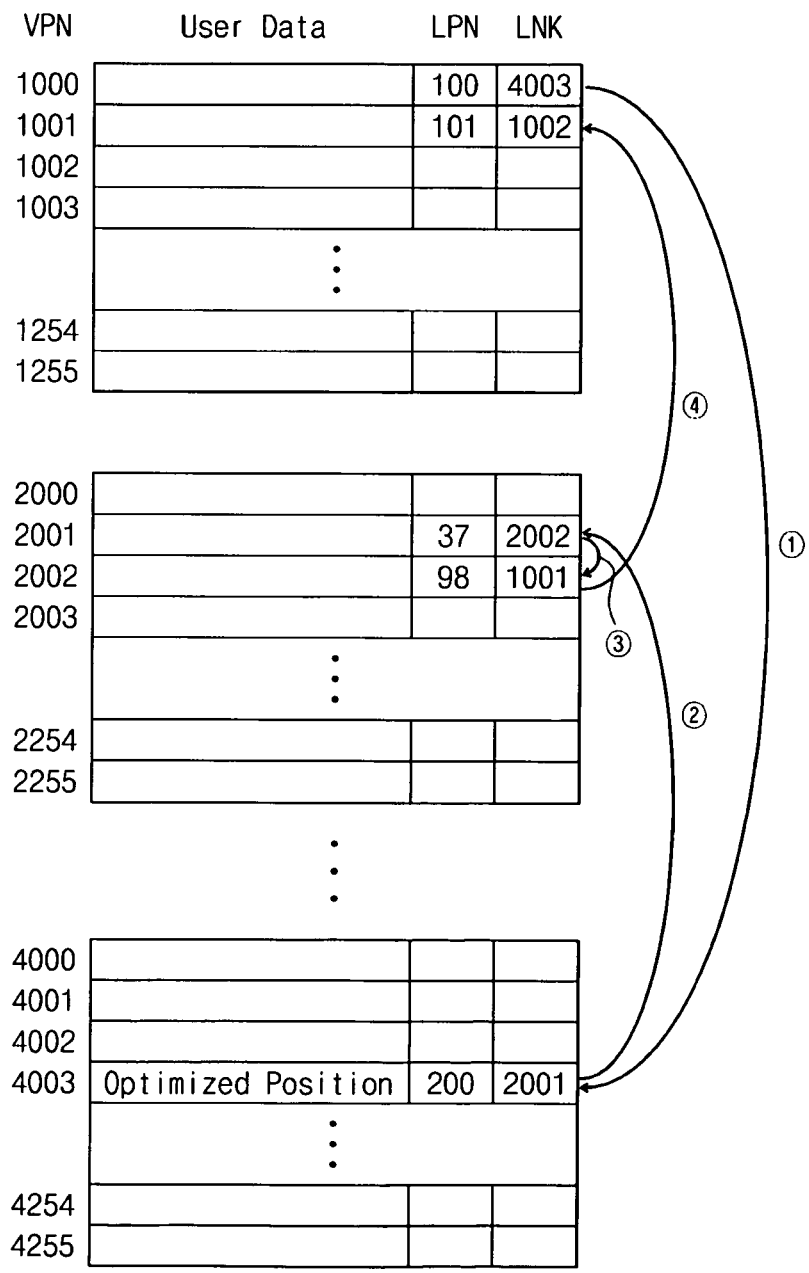
FIG. 9 is a diagram for describing a forward link scan way according to example embodiments.

FIG. 9 is a diagram for describing a forward link scan operation according to example embodiments.

Referring to FIG. 9, a random write operation according to example embodiments may enable a write operation to be performed with respect to a desirable or optimum physical storage space corresponding to a logical address. The random write operation may be carried out as follows.

In the example illustrated in FIG. 9, 100, 200, 37, 98, and 101 may be assumed to be write-requested logical page numbers. Data may be written at a page of a virtual page number 1000 which may correspond to the logical page number 100. According to example embodiments, the logical page number 100 corresponding to the virtual page number 1000 and a virtual page number 4003 corresponding to a page to be scanned next may be written simultaneously. According to example embodiments, the virtual page number 4003 may indicate a desirable or optimum physical storage space when data is written in the logical page number 200. The desirable or optimum physical storage space indicates a space used to reduce the need for performing merge operations, which may be a space used to improve an operating performance of a flash memory.

Data to be written in the logical page number 200 may be written in the virtual physical page number 4003. The logical page number 200 corresponding to the virtual page number 4003 and the virtual page number to be scanned next 2001 may be written simultaneously.

Afterwards, data to be written in the logical page number 37 may be written in the virtual physical page number 2001. The logical page number 2001 corresponding to the virtual page number 37 and the virtual page number 2002 to be scanned next may be written simultaneously.

Afterwards, data to be written in the logical page number 98 may be written in the virtual physical page number 2002. At this time, the logical page number 98 corresponding to the virtual page number 2002 and the virtual page number to be scanned next 1001 may be simultaneously written.

Afterwards, data to be written in the logical page number 101 may be written in the virtual physical page number 1001. The logical page number 101 corresponding to the virtual page number 1001 and the virtual page number to be scanned next 1002 may be written simultaneously.

It may be possible to perform a write operation at a desirable or optimum physical storage space by performing a random write operation according to the above-described way.

In accordance with a conventional random write operation, virtual addresses are given sequentially according to incoming logical addresses. The conventional method may necessitate unnecessary merge operations when existing data is updated. In the event that a block for storing data to be updated is different from a block in which existing data is stored, it may take a lot of time to copy data from an existing block to another block, erase the existing block, and perform a merge operation.

On the other hand, a random write operation according to example embodiments may not need such a merge operation. The FTL according example embodiments may calculate a desirable or optimum virtual physical page number VPN corresponding to a logical page number LPN. For example, in a case where existing data is updated, a desirable or optimum virtual physical page number VPN may be assigned to the same block as the block in which existing data is stored. Accordingly, it may be unnecessary to copy data from an existing block to another block, erase the existing block, and perform a merge operation. As a result, it is possible to reduce a time taken to perform a random write operation.

Figure 10:
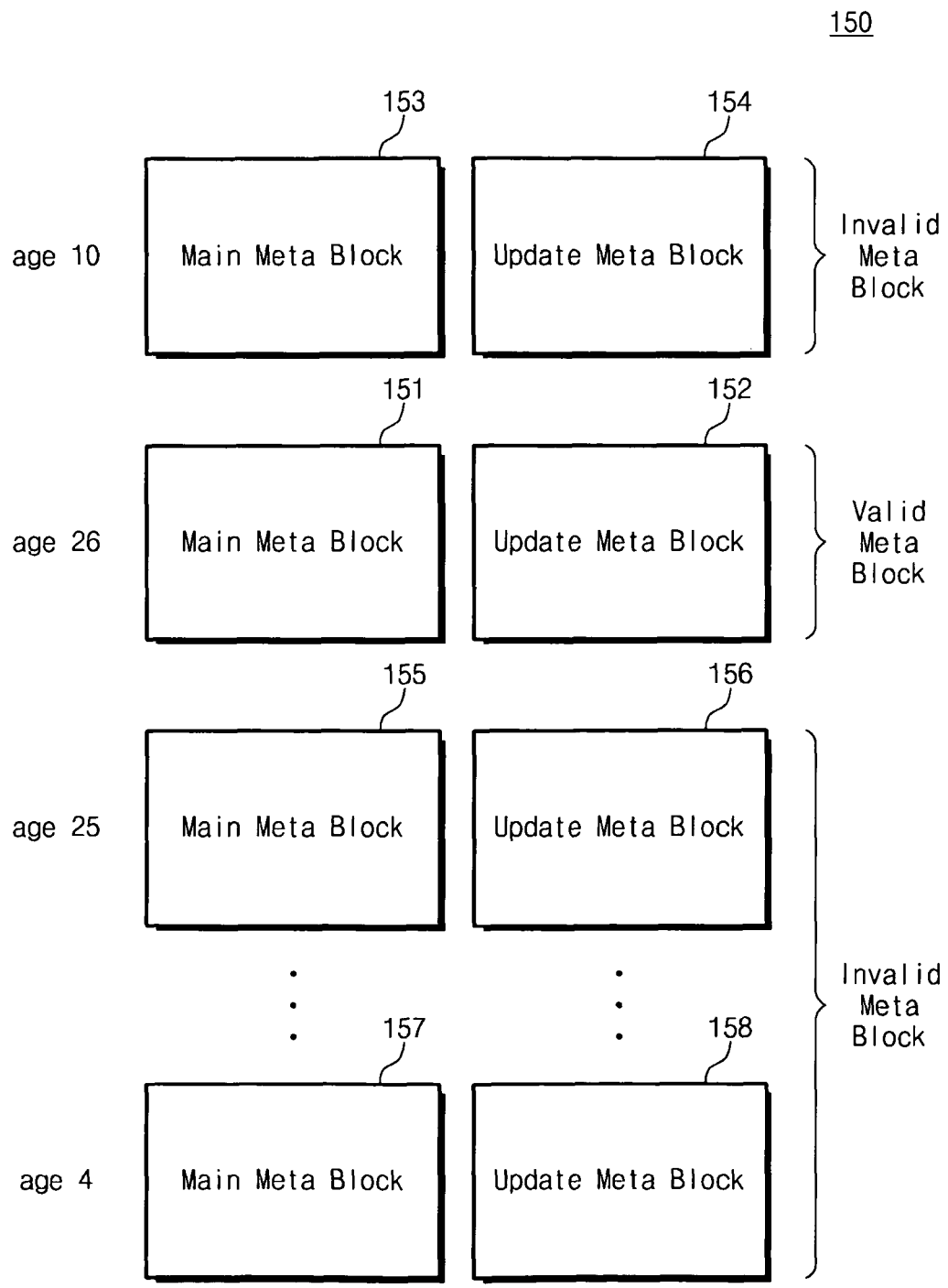
FIG. 10 is a diagram showing meta blocks according to example embodiments.

FIG. 10 is a diagram showing meta blocks according to example embodiments.

Referring to FIG. 10, meta blocks may include valid meta blocks 151 and 152 and invalid meta blocks 153, 154, 155, 156, 157, and 158. According to example embodiments, a block having the highest age value may be determined to be a valid block, where the highest age value indicates mapping information which is updated most recently.

Figure 11:
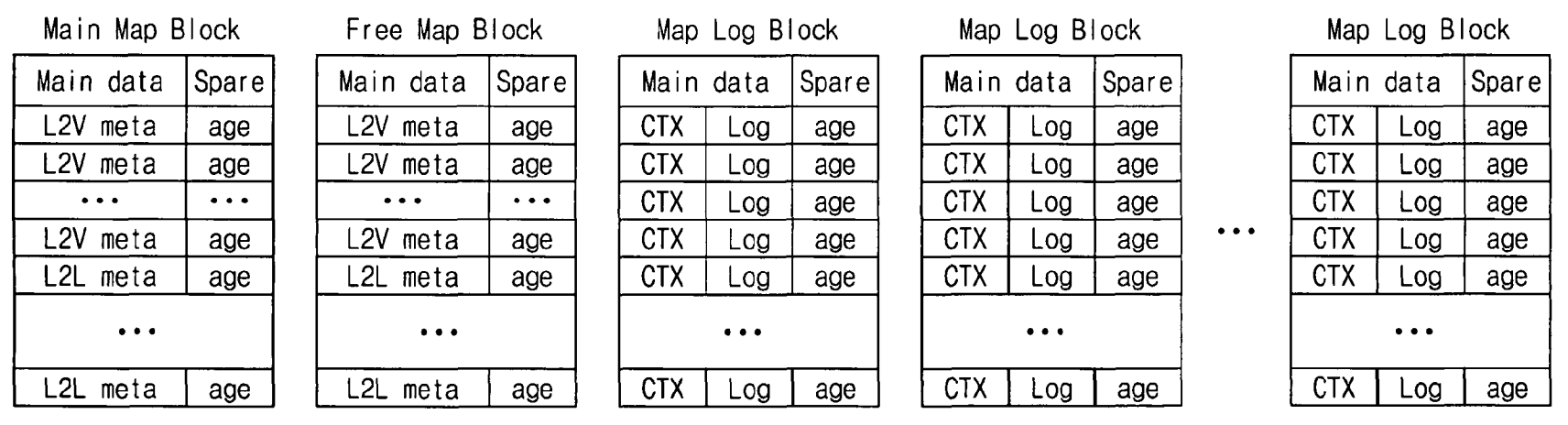

FIG. 11 is a diagram showing items included in meta blocks 153-158 according to example embodiments.

Referring to FIG. 11, meta blocks may include a main map block, a free map block, and a plurality of map log blocks. According to example embodiments, the main and free map blocks may be main meta blocks. Each page may be divided into a main area for storing a logical to virtual page address mapping information L2V and a spare area for storing an age value.

The map log blocks may each be update meta blocks. Each page may be divided into a main area for storing a context CTX and a log, and a spare area for storing an age value. According to example embodiments, the context CTX may include a start point where a scan operation commences, and the log may include updated mapping information.

The map log block may store update mapping information. When updated mapping information is over a given capacity, all update mapping information of map log blocks may be reflected to the main map block, and since up-to-date mapping information is reflected to the main map block, all map log blocks may be erased.

Figure 12A:
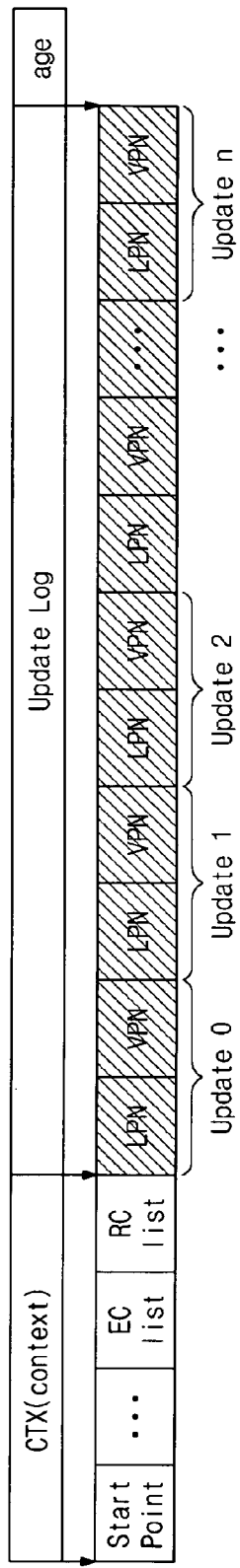
Figure 12B:
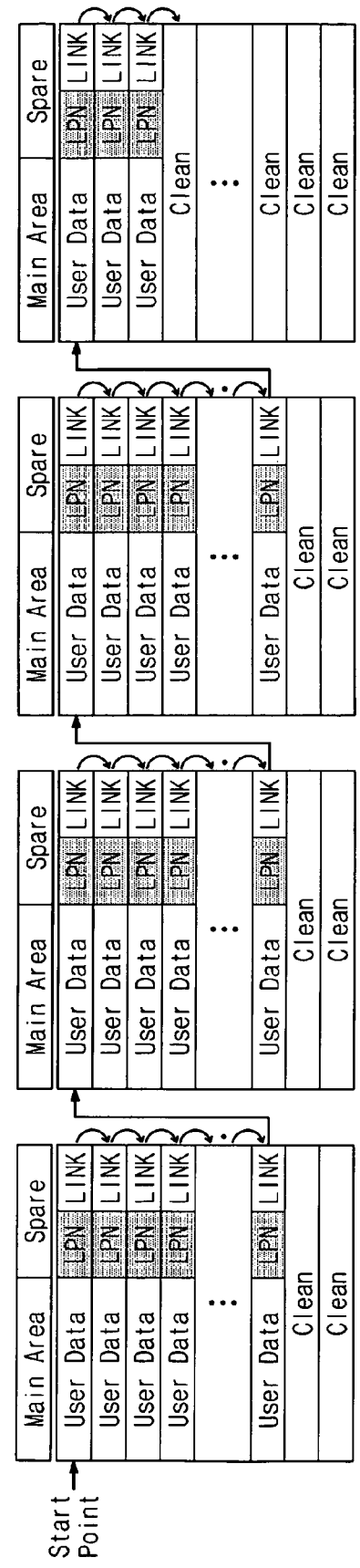
Figure 12C:
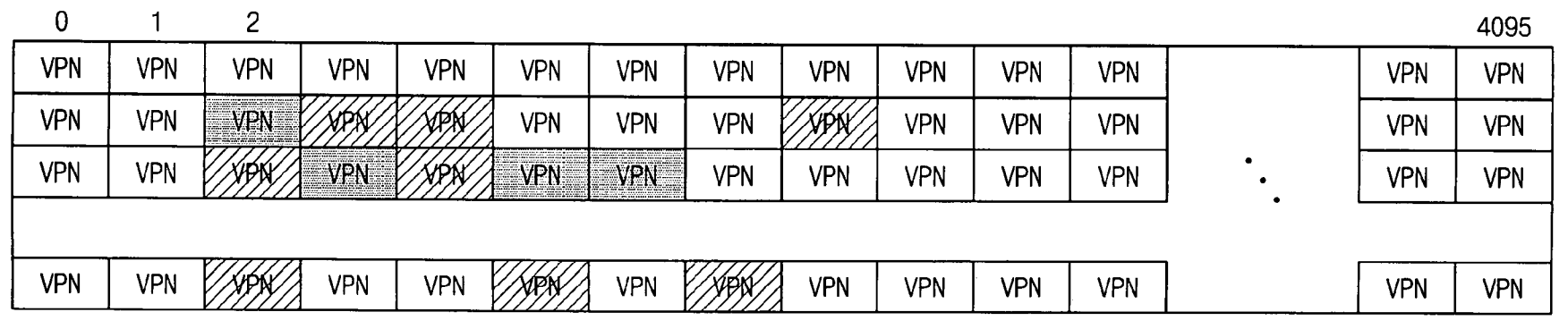

FIGS. 12A to 12C are diagrams for describing an operation of recovering mapping information at an initialization operation in a flash memory system of example embodiments. A mapping information recovering process performed at an initialization operation may be divided into an update mapping information read operation in FIG. 12A, an active page scan operation in FIG. 12B, and final mapping table configuration in FIG. 12C.

Figure 13:
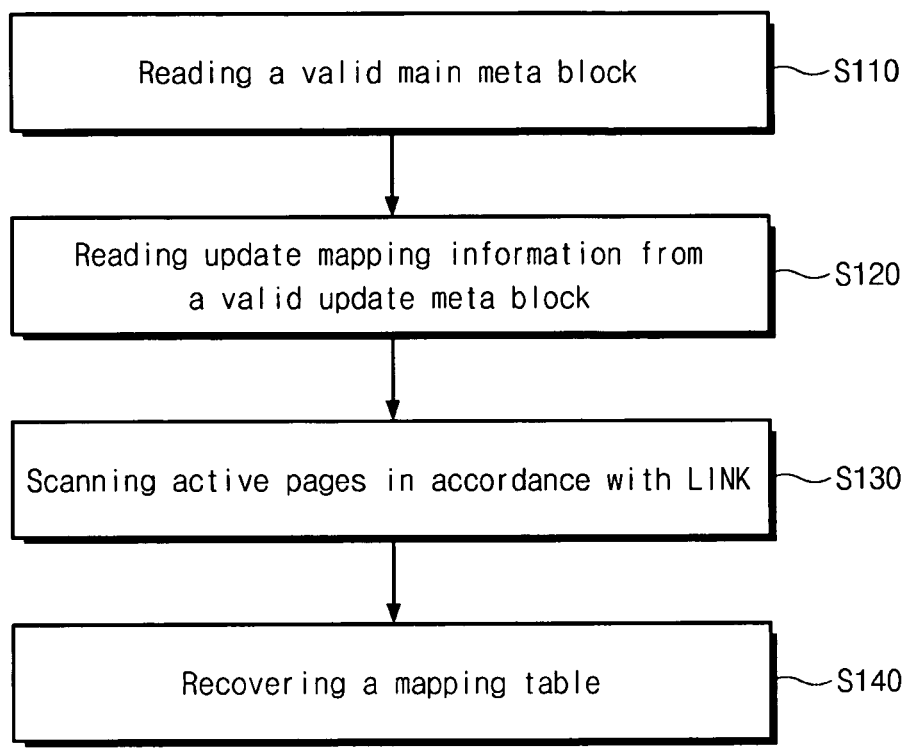
FIG. 13 is a flow chart showing a mapping information recovering process of a flash memory system according to example embodiments.

FIG. 13 is a flow chart showing a mapping information recovering process of a flash memory system according to example embodiments. Below, there will be described an operation of recovering a final mapping state before ending when a power is supplied to a flash memory system 100.

In operation S110, mapping information may be read from a valid main meta block 151 which may be a main map block, and the read mapping information is stored in RAM. According to example embodiments, the read mapping information is a logical to virtual address mapping information and has a mapping state at that time when a main map block is written.

Since updated mapping information is stored in a valid update meta block 152 which may be a map log block, in operation S120, up-to-date mapping information may be updated, with the valid update meta block 152 read in a page unit.

A start point may be stored in a final meta page of the map log block. Active pages not yet stored in the valid update meta block, which may be a map log block, are scanned from the start point in operation S130. A forward link scanning operation may be made from a physical page indicated by the start point with reference to a link value of a space area. If a page finally scanned by the forward link scan operation is a clean page not programmed, the forward link scan operation is completed.

The logical to virtual page address mapping information gathered via scanning of the active pages is reflected to a mapping table of all logical to virtual mapping information L2V placed on RAM, in operation S140. Accordingly, a mapping information recovering operation performed at an initialization operation of the flash memory system 100 is completed.

A recovering process for mapping information, by which a logical page address is mapped to a virtual page address, is described above with reference to a flash memory system according to example embodiments. But, example embodiments are not limited to a flash memory system. The recovering process according example embodiments may be applied to other systems which necessitate an operation of recovering a physical address corresponding to a logical address.

The flash memory system according to example embodiments may reduce a recovering time by performing a scan operation using forward link scanning during a mapping recovering operation. Accordingly, it may be possible to reduce or minimize a decline in performance, and to provide a file translation layer capable of recovering mapping information so that an initialization time is shortened.

Because the memory system according to example embodiments may recover mapping information effectively without the power maintenance hardware, it may be possible to provide a flash memory system which is low in price, long-lived, and small-sized.

The flash memory system according to example embodiments may be capable of being applied to a memory card and a Solid-State Drive/Disk (SSD).

Figure 14:
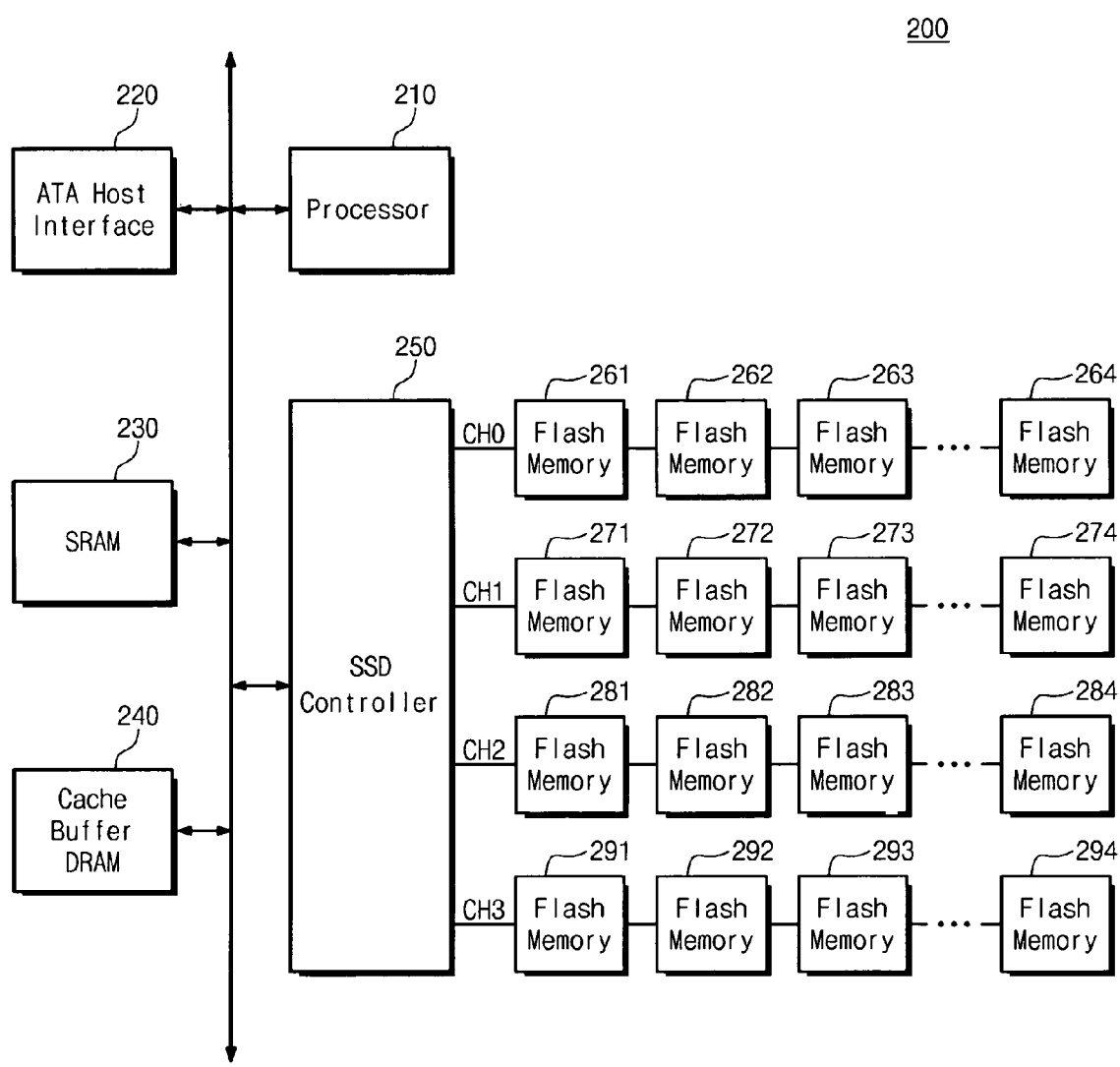
FIG. 14 is a block diagram showing an SSD system according to example embodiments.

FIG. 14 is a block diagram showing an SSD system according to example embodiments.

Referring to FIG. 14, an SSD memory system 200 may include an SSD controller 250 and flash memories 261 to 264, 271 to 274, 281 to 284 and 291 to 294. The SSD controller 250 may function in the same manner as flash controller 130 discussed above with reference to FIG. 1 and perform the write operation and a mapping information recovering operation described with reference to FIGS. 1 to 13. The flash memories may be configured such that at a write operation, a logical page address and a link value to be scanned next are stored together with user data.

A processor 210 may receive a command from a host and determine whether data from the host is stored in a flash memory or whether data stored in the flash memory is sent to the host. An ATA host interface 220 may exchange data with a host according to the control of the processor 210. The ATA host interface 220 may receive commands and addresses from the host to send them to the processor via a CPU bus. According to example embodiments the ATA host interface 220 may be, for example, any one of an SATA interface, a PATA interface, and an External SATA (ESATA) interface. Data received from the host via the ATA host interface 220 or data to be sent to the host may be transferred to a buffer RAM 240 without passing through the CPU bus under the control of the processor 210.

RAM 230 may be used to temporarily store data necessary for operations of the flash memory system 200. The RAM 230 may be a volatile memory, for example, a DRAM, SRAM, or the like.

A cache buffer RAM 240 may temporarily store data transferred between the host and the flash memories. The cache buffer RAM 240 may be further used to store programs which are executed by the processor 210. The cache buffer RAM 240 may be a type of buffer memory formed of SRAM.

The SSD controller 250 may exchange data with the flash memories used as a storage unit. The SSD controller 250 may be configured to support, for example, a NAND flash memory, One-NAND flash memory, or multi-level flash memory.

In accordance with a flash memory system adopting a mapping method of a file translation layer according to example embodiments, it may be possible to prevent a reduction in performance and to recover mapping information so as to reduce or minimize an initialization time.

A flash memory system according to example embodiments may be applied to a mobile storage device. Thus, the flash memory system according to example embodiments may be used as a storage device of a portable apparatus, for example MP3, digital camera, PDA, e-Book, or the like.

A flash memory system or a storage device according to example embodiments may be packed using various types of packages. For example, a flash memory system or a storage device according to example embodiments may be packed using packages including, for example, PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:
1. A memory device comprising:
a memory unit; and
a controller configured to control the memory unit,
wherein the memory unit includes,
 a plurality of physical storage spaces, each of the plurality of physical storage spaces being a page of flash memory including,
  a main area for storing user data during a write operation, and
  a spare area storing additional data other than the user data, the additional data including a logical address corresponding to a physical storage space and a link value indicating a physical storage space to be accessed next,
wherein the memory device is configured to perform a mapping information recovery operation using a forward link scanning operation, which includes scanning a next physical storage space according to the link value included in the additional data of a physical storage space from among the plurality of physical storage spaces, and
wherein the controller is configured such that the forward link scanning operation includes,
 scanning a physical storage space, from among the plurality of physical storage spaces, in which user data is not stored, and ending the forward link scanning operation in response to the scanning of the physical storage space in which user data is not stored.

2. The memory device of claim 1 further comprising:
a meta area for storing mapping information and a start point indicating a physical storage space from which a forward link scanning operation starts.

3. The memory device of claim 1, wherein the memory unit includes an update meta block in which mapping information obtained by the forward link scanning operation is stored.

4. The memory device of claim 3, wherein the update meta block stores a start point indicating a physical storage space from which the forward link scanning operation starts during the mapping information recovering operation.

5. The memory device of claim 1, wherein the memory unit includes a meta area for storing first mapping information, and the memory controller is configured to recover mapping information based on first mapping information read from the meta area and second mapping information obtained by a forward link scanning operation performed based on the link values included, respectively, in the additional data of the plurality of physical storage spaces, during an initialization operation.

6. The memory device of claim 1, wherein the controller includes a file translation layer configured to calculate the link values included, respectively, in the additional data of the plurality of physical storage spaces based on an externally input logical address.

7. A memory system comprising:
the memory device of claim 1;
a processor configured to control the memory device; and
a host interface configured to receive information from a host and to forward the information to the processor, the information including at least one of commands and addresses.

8. The memory system of claim 7, wherein the memory unit includes a meta area for storing first mapping information, and wherein the memory controller is configured to recover mapping information based on first mapping information read from the meta area and second mapping information, obtained by a forward link scanning operation performed based on the link values included, respectively, in the additional data of the plurality of physical storage spaces, during an initialization operation.

9. The memory system of claim 8, wherein the meta area stores the second mapping information and a start point indicating a physical storage space from which the forward link scanning operation starts.

10. The memory system of claim 7, wherein the controller includes a file translation layer configured to calculate the link values included, respectively, in the additional data of the plurality of physical storage spaces based on an externally input logical address.

11. A mapping information recovering method of a memory system which includes a memory device and a memory controller controlling the memory device, the memory device comprising a plurality of physical storage spaces each being a page of flash memory, having a main area for storing user data at a write operation and a spare area for storing additional data other than the user data, the additional data including a logical address corresponding to a physical storage space and a link value indicating a physical storage space to be accessed next, the method comprising:
reading first mapping information from a meta area;
scanning a user area using a forward link scanning operation based on the link value included in the additional data of a physical storage space from among the plurality of physical storage spaces to take second mapping information; and
recovering mapping information from the first mapping information and the second mapping information,
the forward link scanning operation including,
scanning a physical storage space, from among the plurality of physical storage spaces, in which user data is not stored, and
ending the forward link scanning operation in response to the scanning of the physical storage space in which user data is not stored.

12. The memory device of claim 1, wherein the controller is configured such that the forward link scanning operation is ended when the scanned physical storage space is a physical storage space in which user data is not stored, regardless of whether or not the scanned physical storage space in which user data is not stored includes a link to another physical storage space.

13. The method of claim 11, wherein the ending the forward link scanning operation when the scanned physical storage space is a physical storage space in which user data is not stored includes ending the forward link scanning operation regardless of whether or not the scanned physical storage space in which user data is not stored includes a link to another physical storage space.

* * * * *